United States Patent

Clapsaddle, Jr.

[15] 3,646,733
[45] Mar. 7, 1972

[54] SIDE FLAIL MOWER

[72] Inventor: George Sherl Clapsaddle, Jr., c/o Clapsaddle Sales and Services, Whitten, Iowa 50269

[22] Filed: Mar. 17, 1970

[21] Appl. No.: 20,251

[52] U.S. Cl. ................................56/7, 56/15.2, 56/16.2
[51] Int. Cl. ...........................................A01d 35/24
[58] Field of Search....................56/6, 7, 13.6, 12.7, 15.1, 56/15.2, 15.3, 15.9, 16.2, 16.3

[56] References Cited

UNITED STATES PATENTS

| 3,177,638 | 4/1965 | Johnson | 56/7 |
| 2,168,706 | 8/1939 | George et al. | 56/7 |
| 2,677,224 | 5/1954 | Stegeman | 56/7 |
| 2,952,109 | 9/1960 | Lambert | 56/13.6 |
| 2,299,859 | 10/1942 | Speiser | 56/7 |
| 3,092,053 | 6/1963 | Kirkpatrick | 56/15.3 X |
| 3,422,610 | 1/1969 | Wetherell | 56/13.6 X |

FOREIGN PATENTS OR APPLICATIONS

| 981,783 | 1/1965 | Great Britain | 56/12.7 |

Primary Examiner—Robert Peshock
Assistant Examiner—J. N. Eskovitz
Attorney—Murray Robinson, Ned L. Conley, Robert W. B. Dickerson and Bill B. Berryhill

[57] ABSTRACT

Outrigger is longitudinally hinged at inner edge to tractor and at outer edge to ground-supported cutter unit. Outrigger positions cutter as far to side of tractor as tractor wheels or beyond. Outrigger hydraulic cylinder connects outrigger to tractor to swing outrigger up and down, about inner hinge axis, thereby to raise and lower outer hinge axis to adapt cutter to terrain. Cutter hydraulic cylinder connects cutter to tractor at inner hinge axis to swing cutter up and down about outer hinge axis without preventing independent operation of outrigger cylinder. Cutter can be swung up to near vertical position with cutter cylinder and then hook on cutter can be dropped into eye on tractor by lowering outrigger with outrigger cylinder, thereby mechanically locking cutter in elevated position. Cutter is of flail type and is powered from front end of tractor crankshaft through a drive train. Inner end of flail shaft is above inner hinge axis by radial distance from shaft to cutter at end of flail, thereby to maintain inner edge of swath cut by cutter unit fixed at outer edge of outrigger regardless of angle of cutter to horizontal.

9 Claims, 9 Drawing Figures

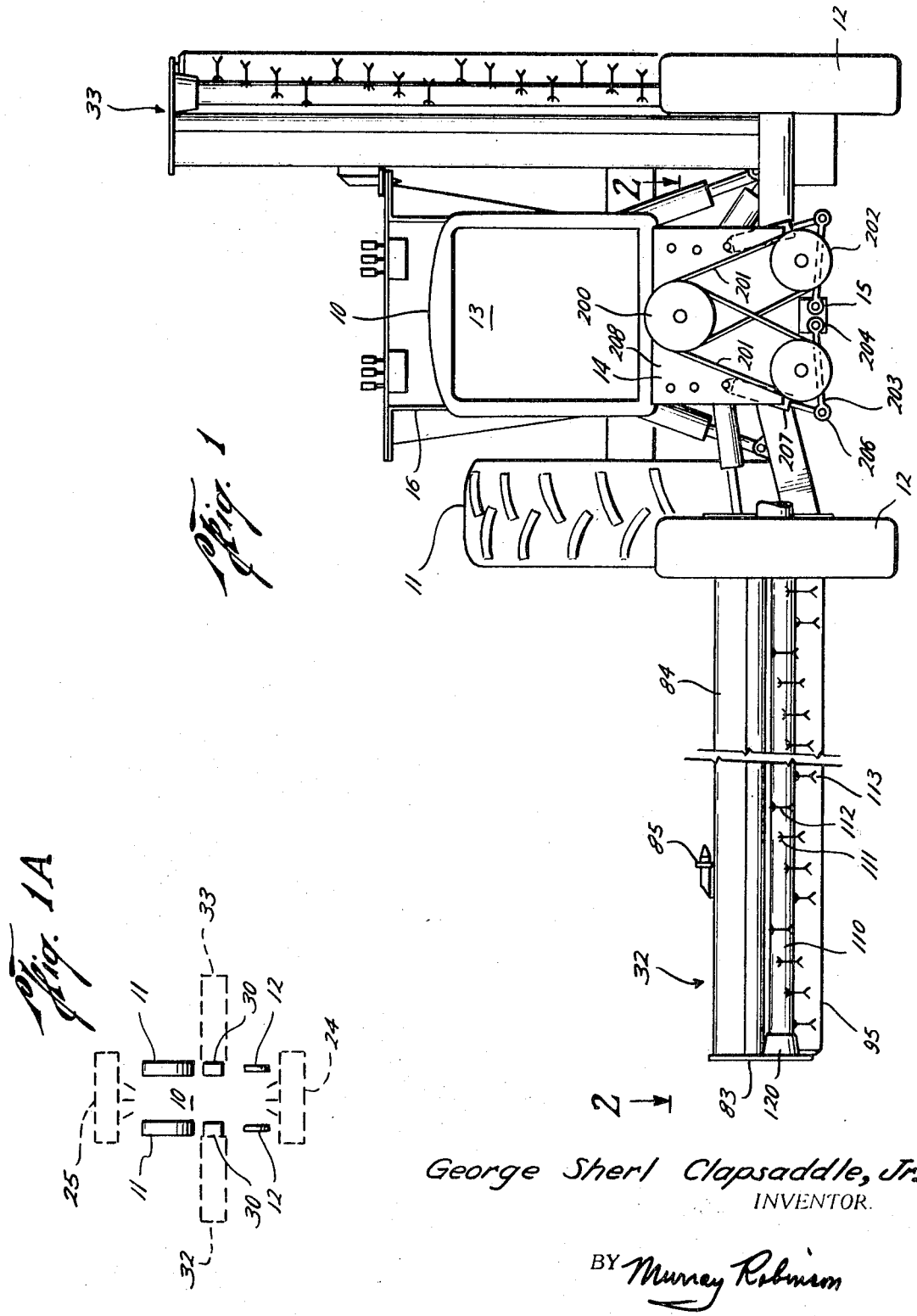

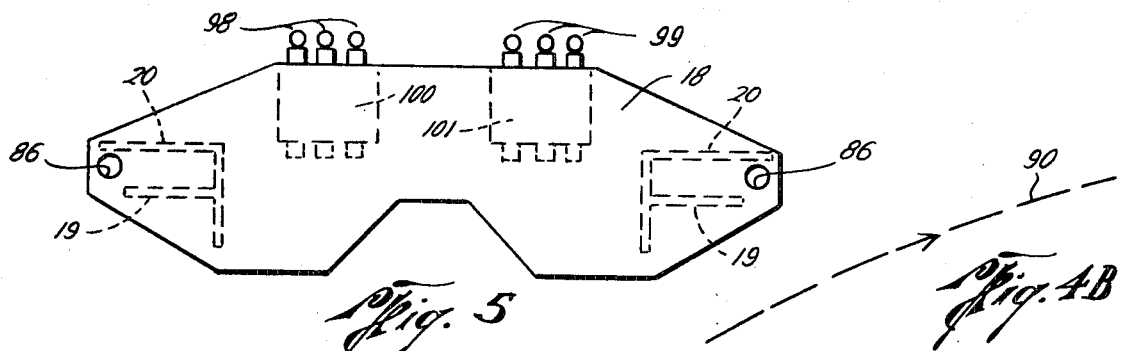
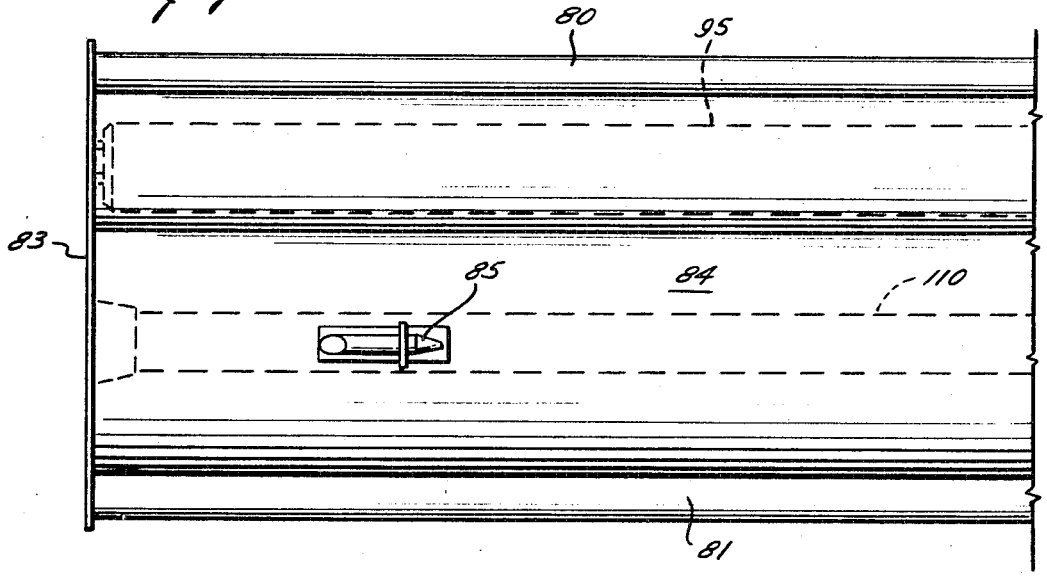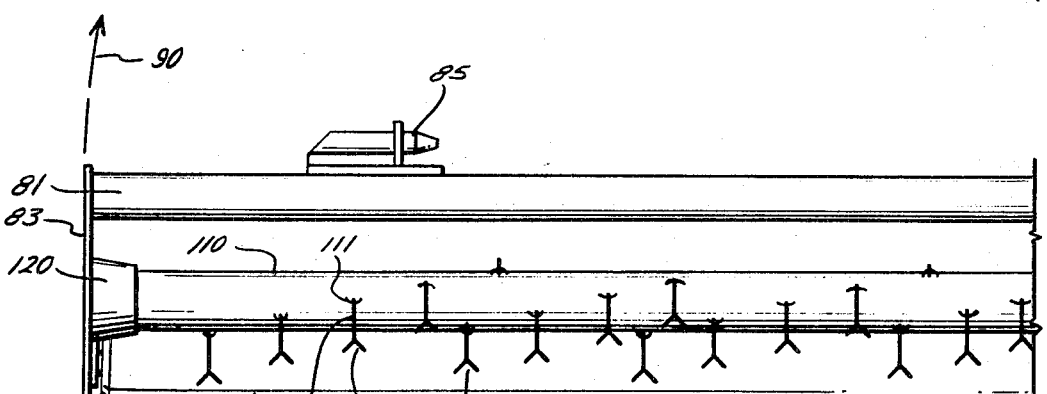

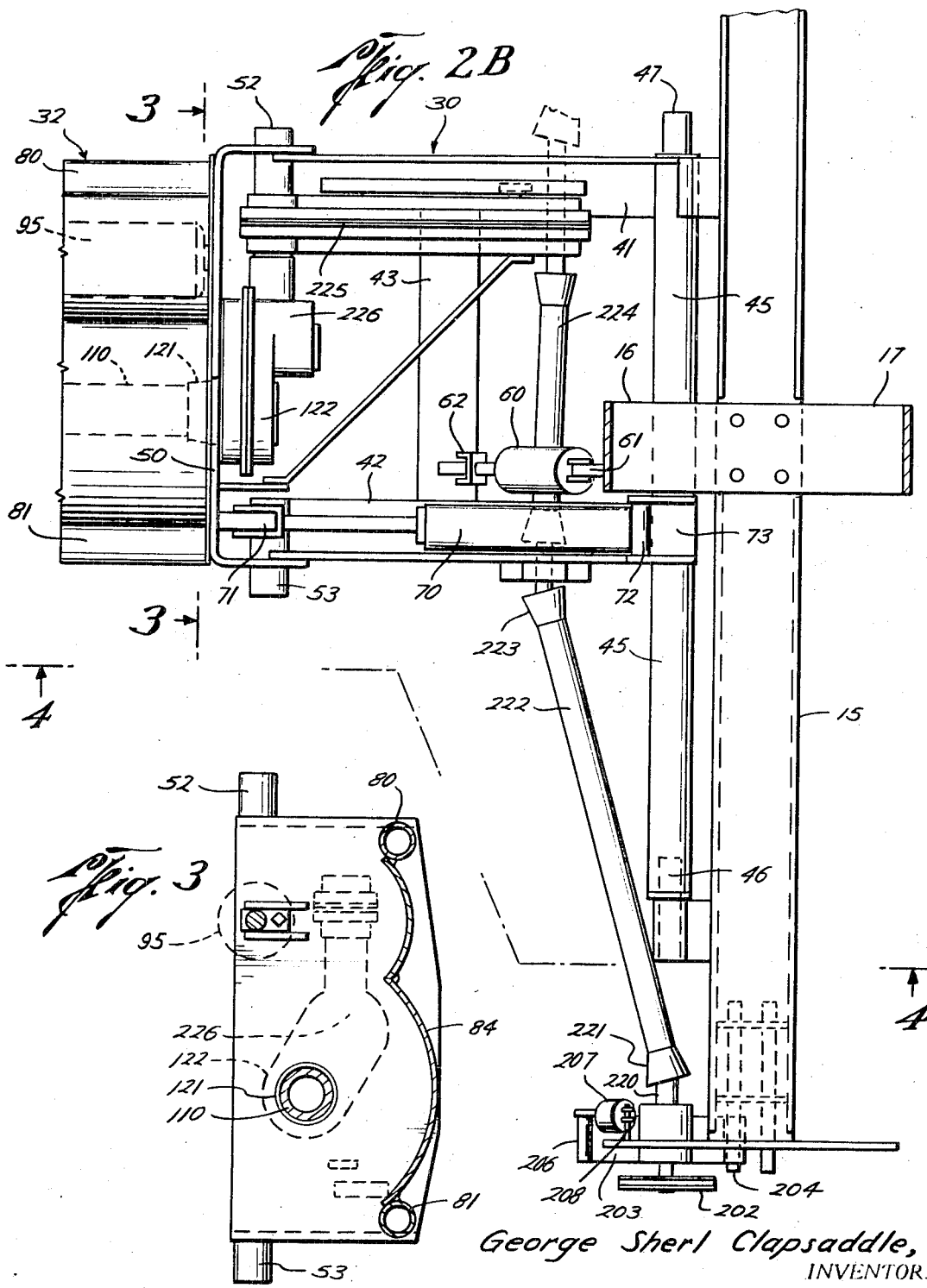

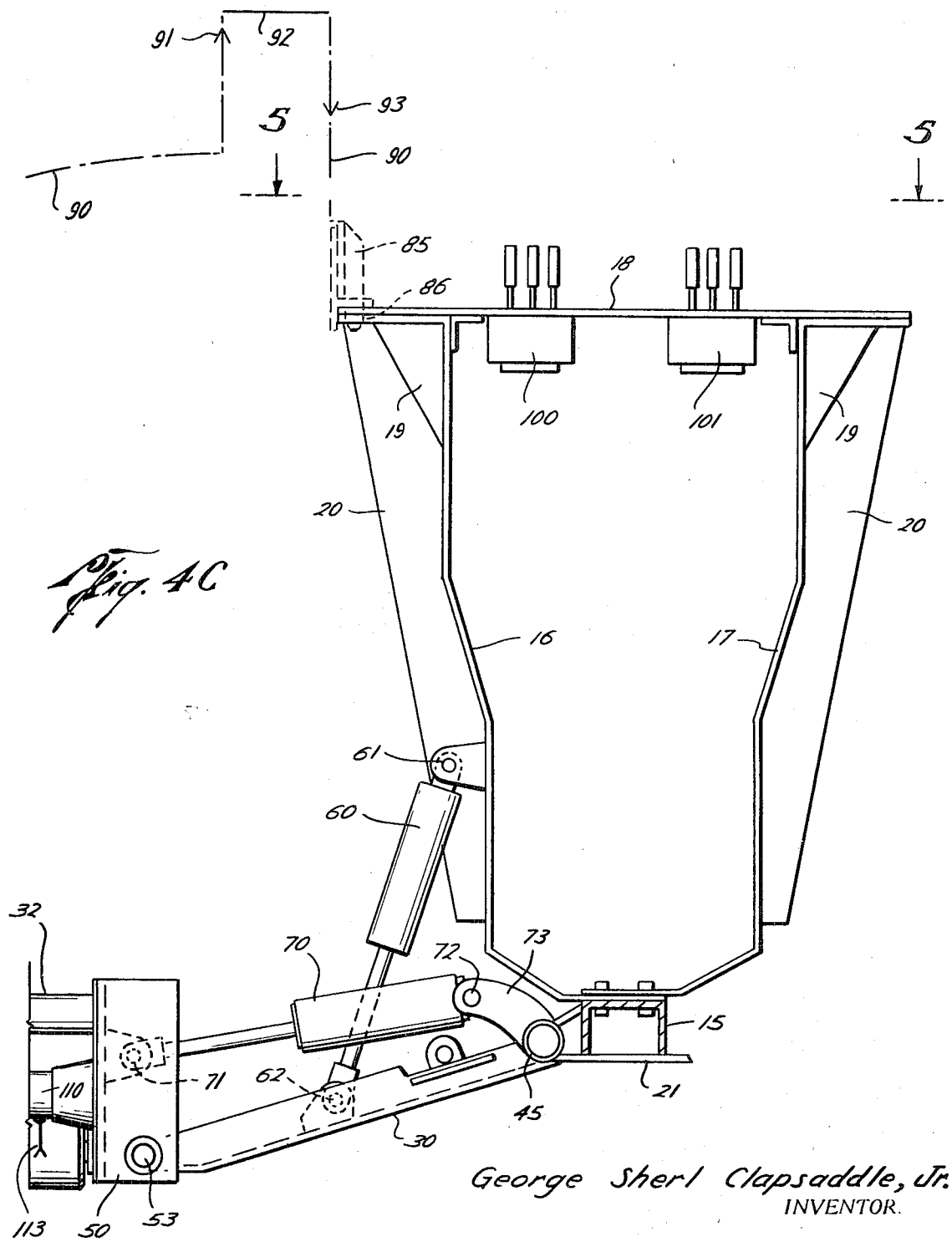

SIDE FLAIL MOWER

BACKGROUND OF THE INVENTION a. Field of the Invention

This invention relates to mowers and especially to such mowers as may be used for cutting grass and weeds adjacent highways. In particular it relates to side mower attachments for tractors.

b. Description of the prior Art

It is known to attach mowers to the rear, front, and sides of tractors. Sometimes the cutting elements of the mowers are actuated by the turning of the wheels which support the mowers as same are moved over the terrain and sometimes the cutting elements are powered by connection to a separate motor or connected through a suitable drive train to a power take off shaft driven by a tractor engine. Various problems are experienced to which the present invention addresses itself.

BRIEF DESCRIPTION OF DRAWINGS

For a description of a preferred embodiment of the invention reference will now be made to the accompanying drawings wherein:

FIG. 1 is a front view of a tractor with flail-type mowers attached to the sides thereof in accordance with the invention;

FIG. 1A is a schematic plan view of a tractor with front and rear mowers as well as side mowers;

FIGS. 2A and 2B, together hereinafter sometimes referred to as FIG. 2, form a horizontal section taken at plane 2—2 of FIG. 1;

FIG. 3 is a vertical section taken at plane 3—3 of FIG. 2B;

FIGS. 4A, 4B, 4C, together hereinafter sometimes referred to as FIG. 4, form a vertical section taken at plane 4—4 of FIG. 2; and FIG. 5 is a plan view taken at plane 5—5 of FIG. 4C.

DESCRIPTION OF PREFERRED EMBODIMENT

Referring now to FIGS. 1, 1A, 2B, and 4C, there is shown a tractor 10 (FIG. 1) having rear wheels 11 and front wheels 12. Beneath the front end of the engine 13 is bolted a mounting plate 14. Extending beneath the tractor body there is a mounting channel 15 which is bolted to the body. Bolted to the channel are sideplates 16, 17. A top plate 18 is bolted to the sideplates. Gussets 19, 20 reinforce the mounting frame formed by the channel, sideplates and top plate. The mounting frame may also include a bottom plate 21 extending along under channel 15 and welded or bolted thereto.

As shown in FIG. 1A, conventionally mounted and/or driven cutters 24, 25 may be connected to the tractor at the front and rear to the tractor, each cutter including adjustable height rotatable ground support means such as a roller and a mowing means, e.g., of the rotary flail type, driven from the front and rear power takeoffs of the tractor.

At each side of the tractor hingedly connected to the mounting frame are outriggers 30 (see FIGS. 2B and 4C) to the outer edges of which are hingedly connected cutters 32, 33, cutter 32 being shown in FIG. 1 in position for mowing (horizontal) and cutter 33 being shown elevated (vertical) in locked position as adapted for highway travel.

Referring now especially to FIGS. 2B and 4C each outrigger includes a pair of front and back channels 41, 42 connected together by plate 43. A tube 45 at the inner edge of the outrigger is rotatably mounted on pivots 46, 47 carried by the mounting frame, providing inner hinge means pivotally connecting the inner edge of the outrigger to the tractor.

A channel 50 fastened to the inner edge of the cutter 32 is rotatably mounted on pivot pins 52, 53 secured to the outrigger at the outer edge thereof providing outer hinge means pivotally connecting the inner end of the cutter to the outer edge of the outrigger.

Hydraulic power means for swinging each outrigger up and down about the axis of the hinge connection to the tractor is provided by a hydraulic cylinder 60 pivotally connected at one end to the mounting frame at 61, thereby connecting it to the tractor, and pivotally connected at the other end at 62 to the outrigger.

Hydraulic power means for swinging each cutter up and down about the axis of its hinge connection to the outrigger is provided by a hydraulic cylinder 70 pivotally connected at one end to the cutter at 71 and at its other end pivotally connected at 72 to arm 73 fixed to tube 45.

Referring now to FIGS. 2 and 4, each cutter includes a frame comprising a pair of bars 80, 81 fastened at their inner ends to channel 50 and at their outer ends to plate 83. A downwardly curved plate 84 extends between bars 80, 81. On top of plate 84 is secured a pin 85 providing hook means for engaging a socket or eye 86 (FIG. 4C and FIG. 5) in the top plate 86 of the mounting frame when the cutter is elevated to vertical position and then dropped into locked travel position as shown at the right of FIG. 1.

To move the cutter from the mowing position shown at the left of FIG. 1 to the travel position sown at the right of FIG. 1, the outer end of the cutter follows the path indicated by the dashed line 90 in FIGS. 4A, 4B, 4C, the edge moving through an arc as the hydraulic cylinder 70 is actuated to swing the cutter up about the outer hinge connection of the outrigger, and then moving up as indicated by arrow 91 when the outrigger is swung up about its inner hinge axis by hydraulic cylinder 60. The cutter is then swung in as indicated at 92, either manually or with the aid of hydraulic cylinder 70 until the pin 85 overlies socket 86. The cutter is then dropped as indicated at 93 by operating hydraulic cylinder 60 until pin 85 is in socket 86. A reverse sequence of operations is used to unlock the cutter and move it to the mowing position.

In the mowing position either or both of hydraulic cylinders 60, 70 may be set to be free floating, that is, not to have any set position, whereby the cutter can follow the terrain as dictated by rotatably mounted ground support means such as roller 95 rotatably mounted at the rear lower edge of the cutter at an adjustable height.

The hydraulic lines to the hydraulic cylinders are conventional and hence are now shown. They may be powered from the usual hydraulic power takeoff from the tractor or from a separately driven hydraulic unit. The valves 98, 99 for controlling the cylinders may be mounted on top plate 18 of the mounting frame in boxes 100, 101 provided for that purpose.

Each cutter includes a shaft 110 to which are connected, e.g., by eyes 111, a plurality of flails, each flail including a chain link or clevis 112 carrying one or more knives 113 at its outer end. Shaft 110 is rotatably mounted in bearing means 120 at its outer end and in bearing means 121 at its inner end, the latter being a part of chain housing 122 (FIGS. 2B and 3), which is part of the drive train by which the cutter is powered to rotate shaft 110. As best shown in FIG. 4C, the inner end of shaft 110 is spaced above the axis of the hinged connection of the cutter to the outrigger defined by pivot pins 53, 52 sufficiently so that when the cutter is horizontal, innermost flail 113 is at the same level as the axis of pin 53. This maintains the edge of the swath cut by the fails in a straight line despite rise and fall of the outer edge of the cutter. This is desirable in itself and also insures that the swath thus cut will overlap that cut by the medially mounted front and/or rear cutters 24, 25.

The drive train for shaft 110 starts at the front end of the tractor and includes common pulley 200 (FIG. 1) which is connected to the tractor motor crankshaft. Pulley 200 is connected by belts 201 to drive pulleys 202 at the right and left sides of the tractor. Each pulley 202 is mounted on an arm 203 pivotally connected at one end at 204 to the channel 15 of the mower mounting frame, and pivotally connected at its other end at 206 to one end of a hydraulic cylinder 207 whose other end is pivotally connected at 208 to the front plate 14 of the mower mounting frame. There is thus provided hydraulic means for tightening and loosening belts 201 whereby the power drive to the cutter shafts 110 can be activated and deactivated as desired. The hydraulic cylinder 207 is preferably connected to the same hydraulic source (not shown) as are hydraulic cylinders 60 and 70 and controlled by a similar valve placed in one of the boxes 100, 101 in the top mounting plate 18.

Each pulley 202 drives a shaft 220 which by a universal joint 221 drives an angled shaft 222 extending rearwardly to the side of the tractor. A universal joint 223 connects shaft 222 to a shaft 224 which through chain and sprocket means 225 drives the input to right angle gearbox 226. The output of the gearbox drives chain and sprocket means 122 which is connected to shaft 110.

It will be apparent that attachment means has been provided for connecting side cutters of the flail type to a tractor which may be of any conventional type. By slight adaptations of the mounting frame, the invention is adaptable to a variety of types of tractors. Also, the invention is applicable as original equipment to tractor-powered mowers in which case the mower mounting means may be part of the tractor, and in the following claims where reference is made to "tractor-supported mower mounting means" such expression is to be understood to include both a mower mounting means that is bolted or otherwise attached to a tractor and also a mower mounting means that forms part of the tractor as originally manufactured.

Although in the drawings the cutter has been illustrated to be movable between horizontal and vertical positions, the cutter is actually so hinged that it can move to lowered positions considerably below the horizontal. Also, the cutter need not be in a vertical position when it is mechanically locked in elevated position, although such is preferred. The outrigger can also move up and down below a horizontal position.

While a preferred embodiment of the invention has been shown, various modifications can be made by one skilled in the art without departing from the spirit of the invention.

I claim:

1. Mowing apparatus comprising:
   mower mounting means adapted for support by a tractor and providing means for mounting an outrigger at the side of such tractor, considering the fore and aft axis of a tractor as exemplifying longitudinal directions and horizontal lines perpendicular thereto as defining transverse directions extending from side to side of the tractor,
   a cutter including mowing means and rotatable ground support means for supporting the mowing means,
   an outrigger longitudinally hinged adjacent its inner edge to said mounting means at the side thereof and longitudinally hinged adjacent its outer edge to adjacent the inner end of said cutter,
   said mowing means including a rotatably mounted shaft on which is mounted a plurality of flails, and
   power means to rotate said shaft.
   the axis about which said cutter is hinged to said outrigger being spaced below the axis of said shaft a distance of the order of the distance from the axis of said shaft to the tip of one of said flails, whereby the inner edge of the swath cut by the mowing means is fixed at the outer edge of the outrigger regardless of the angle of the cutter to the outrigger.

2. Mowing apparatus comprising:
   mower mounting means adapted for support by a tractor and providing means for mounting an outrigger at the side of such tractor, considering the fore and aft axis of a tractor as exemplifying longitudinal directions and horizontal lines perpendicular thereto as defining transverse directions extending from side to side of the tractor,
   a cutter including mowing means and rotatable ground support means for supporting the mowing means,
   an outrigger longitudinally hinged adjacent its inner edge to said mounting means at the side thereof and longitudinally hinged adjacent its outer edge to adjacent the inner end of said cutter, and
   drive train means to connect said mowing means to power means on such tractor for operating said mower means;
   said drive train means including an element whose axis of rotation is coaxial with the axis about which said cutter is hinged to said outrigger, whereby said cutter can swing up and down about the axis of its hinged connection to said outrigger without interfering with the operation of said drive train means.

3. Apparatus according to claim 2 wherein said drive train means includes
   rotating means carried by said outrigger eccentric to the axis about which said outrigger is hinged to said mounting means, and
   universal joint means for connecting said rotating means to a front-end power takeoff from such tractor.

4. Apparatus according to claim 3 wherein said drive train means further includes said tractor having a front-end tractor power takeoff,
   a pulley on said takeoff,
   a second pulley mounted on an arm pivotally connected to said mounting means,
   a belt connected to said pulleys, and
   a hydraulic cylinder pivotally connected at one end to said arm and at another end to said mounting means.

5. Mowing apparatus comprising:
   mower mounting means adapted for support by a tractor and providing means for mounting an outrigger at the side of such tractor, considering the fore and aft axis of a tractor as exemplifying longitudinal directions and horizontal lines perpendicular thereto as defining transverse directions extending from side to side of the tractor,
   a cutter including mowing means and rotatable ground support means for supporting the mowing means,
   an outrigger longitudinally hinged adjacent its inner edge to said mounting means at the side thereof and longitudinally hinged adjacent its outer edge to adjacent the inner end of said cutter,
   drive train means to connect said mowing means to power means for operating said mower means; and
   power means interconnecting said cutter with a part of the apparatus that is coaxial with the axis about which said outrigger is hinged to said mounting means for swinging said cutter relative to the axis about which said cutter is hinged to said outrigger without swinging the outrigger relative to the axis about which it is hinged to said mounting means.

6. Apparatus according to claim 5 including
   power means interconnecting said outrigger with said mounting means for swinging said outrigger about the axis relative to which it is hinged to said mounting means.

7. Apparatus according to claim 5 wherein the last said power means comprises first hydraulic cylinder means, said apparatus further including second hydraulic cylinder means pivotally connected to said outrigger and said mounting means for swinging said outrigger relative to the axis about which it is hinged to said mounting means.

8. Apparatus according to claim 7 including
   pin and socket means carried by said cutter and mounting means interengageable when said cutter is in a vertical position with the pin and socket aligned, being interengageable by lowering said outrigger with said second hydraulic cylinder means, thereby to lock said cutter in vertical position.

9. Mowing apparatus comprising:
   mower mounting means adapted for support by a tractor and providing means for mounting an outrigger at the side of such tractor, considering the fore and aft axis of a tractor as exemplifying longitudinal directions and horizontal lines perpendicular thereto as defining transverse directions extending from side to side of the tractor,
   a cutter including mowing means and rotatable ground support means for supporting the mowing means,
   an outrigger longitudinally hinged adjacent its inner edge to said mounting means at the side thereof and longitudinally hinged adjacent its outer edge to adjacent the inner end of said cutter, drive train means to connect said, mowing means to power means for operating said mowing means, and hydraulic cylinder means pivotally connected to said cutter and pivotal relative to said mower mounting means for swinging said cutter relative to the axis about which it is hinged to said outrigger whereby the cutter can be moved to a substantially vertical position, second hydraulic cylinder means pivotally connected to said outrigger and said mower mounting means for swinging said outrigger relative to the axis about which it is hinged to said mounting means whereby when said cutter is in such substantially vertical position it can be substantially translated up and down by actuation of the second hydraulic cylinder means, and mechanical means carried by said apparatus interengageable by downward translation of said cutter by means of said second hydraulic means when said cutter is in such substantially vertical position to lock said cutter against accidentally swinging out of elevated position.

\* \* \* \* \*